United States Patent [19]

Osada et al.

[11] Patent Number: 4,492,991

[45] Date of Patent: Jan. 8, 1985

[54] METHOD AND APPARATUS FOR CONTROLLING THE STEPPING FEED OF AN INFORMATION MEDIUM

[75] Inventors: Noboru Osada, Yokohama; Akira Kanamori, Kanazawa; Takashi Kimura, Kawasaki; Seiro Moroto, Tokyo; Hideo Horie; Teruhide Yoshizoe, both of Yokohama, all of Japan

[73] Assignee: Fujitsu Limited, Kawasaki, Japan

[21] Appl. No.: 364,850

[22] PCT Filed: Jul. 30, 1981

[86] PCT No.: PCT/JP81/00172

§ 371 Date: Mar. 22, 1982

§ 102(e) Date: Mar. 22, 1982

[87] PCT Pub. No.: WO82/00540

PCT Pub. Date: Feb. 18, 1982

[30] Foreign Application Priority Data

Jul. 31, 1980 [JP] Japan .................. 55-105896

[51] Int. Cl.³ .......................... G11B 21/04
[52] U.S. Cl. ...................... 360/70; 360/62; 360/74.4; 360/101
[58] Field of Search ............ 360/62, 74.4, 74.5, 360/101, 49, 51-52, 70, 72, 84

[56] References Cited

U.S. PATENT DOCUMENTS 3,274,574 9/1966 Miller ........................... 360/62
3,771,125 11/1973 Nagahori et al. ............... 371/13
3,932,894 1/1976 Arter et al. ................. 360/106 X

OTHER PUBLICATIONS

IBM/TDB, vol. 22, No. 11, Apr. '80, pp. 5101-5102, "Error Recovery in Rotating Head Digital Recorders", by Arter et al.

Primary Examiner—John H. Wolff
Attorney, Agent, or Firm—Staas & Halsey

[57] ABSTRACT

In a mass storage system, a method for controlling the stepping feed of an information medium (T) on which recording tracks are formed by stripes ($T_n$) which run diagonally or vertically across the information medium is disclosed. According to this method, the feed of the information medium (T) begins after the completion of the recording or reading operation of data (DATA) upon a first recording track ($T_n$) and prior to the completion of the checking of the content of the data (DATA). After that, it is determined whether the feed of the information medium is continued or reversed should be in accordance with the result of checking the content of the data (DATA). That is, when no error is detected as a result of the checking, the feed is continued so as to perform the recording or reading operation of data (DATA') upon a second recording track ($T_{n+1}$). Contrary to this, when an error is detected as a result of the checking, the feed is reversed so as to repeat the recording or reading operation of data upon the first recording track ($T_n$).

12 Claims, 33 Drawing Figures

Fig. 8A DATA END

Fig. 8B STEP

Fig. 8C FF

Fig. 8D REVERSE

Fig. 9A DATA END

Fig. 9B STEP

Fig. 9C FF

Fig. 9D REVERSE

METHOD AND APPARATUS FOR CONTROLLING THE STEPPING FEED OF AN INFORMATION MEDIUM

BACKGROUND OF THE INVENTION

The present invention relates to a method for controlling the stepping feed of an information medium such as a magnetic tape used in a mass storage system (which is called an MSS).

In recent years, as data processing systems have developed, the amount of data to be processed has increased rapidly. This data is usually stored on magnetic disks or magnetic tapes during and after processing. These magnetic disks or magnetic tapes are often kept in a storehouse or the like due to the limited size of the installation space. However, it is necessary to have access to large amounts of data for on-line operations. Therefore, as occasion demands, the magnetic disks or magnetic tapes on which the data is stored must be taken out of the storehouse or the like and mounted on a data access device. Accordingly, there are many problems regarding the custody and mounting of the magnetic disks or tapes.

In order to solve the above-mentioned problems, an MSS by which large amounts of data can be under the control of the system has been developed. The information medium used in the MSS is called a data cartridge which is comprised of a magnetic tape approximately 7 cm wide and 20 m long housed in a cylindrical shell approximately 5 cm in diameter and 9 cm long. The data cartridge storage capacity is, for example, 50M bytes, and 706 to 9440 data cartridges can be stored in one MSS. When a data cartridge is needed by the data processing system, the data cartridge is carried by an accessor from the storage area to the data accessing device, and then data processing is performed on the data cartridge. Recording tracks on the magnetic tape are stripes which run diagonally across the tape. Track positioning of a magnetic head is performed by a servo mechanism. The present invention relates to a method for controlling the stepping feed of such a magnetic tape by the amount of one stripe.

One conventional method for controlling the stepping feed of a magnetic tape comprises the steps of: recording or reading data on a recording track; checking the recorded or read data on the recording track; if no error is detected as a result of the checking, feeding the magnetic tape by the amount of one stripe so as to record or read data on the next recording track; and if an error is detected as a result of such checking, recording or reading the data again on the recording track. However, in this conventional method, since the feed operation of the magnetic tape cannot be started until the checking of recorded or read data is completed, it takes a substantial amount of time to feed the magnetic tape; in other words, there is a disadvantage in that the the data transfer rate is slow.

SUMMARY OF THE INVENTION

It is an object of the present invention to provide a method for controlling the stepping feed of an information medium on which recording tracks are formed by stripes which run diagonally or vertically across the information medium, whereby the delay caused by the feed operation of the information medium can be substantially reduced and, accordingly, the transfer rate for data can be increased.

According to the present invention, there is provided a method for controlling the stepping feed of an information medium on which recording tracks are formed by stripes which run diagonally or perpendicularly across said information medium, comprising the steps of: recording or reading data on a first recording track; checking the recorded or read data on the first recording track; feeding the information medium in preparation for recording or reading data on a second recording track next to the first recording track, after the recording or reading of the first recording track is completed and before the checking is completed; and determining whether the feeding is to be forwarded or reversed in accordance with the result of said checking of the first recording track at a time when the checking is completed.

The present invention will be more clearly understood from the following description, contrasting the present invention with the conventional method, and with reference to the accompanying drawings.

BRIEF DESCRIPTION OF THE DRAWINGS

FIGS. 8A through 8H and FIGS. 9A through 9H are timing waveform diagrams for explaining the operation of the circuit of FIG. 7;

DESCRIPTION OF THE PREFERRED EMBODIMENTS

Figure 1:
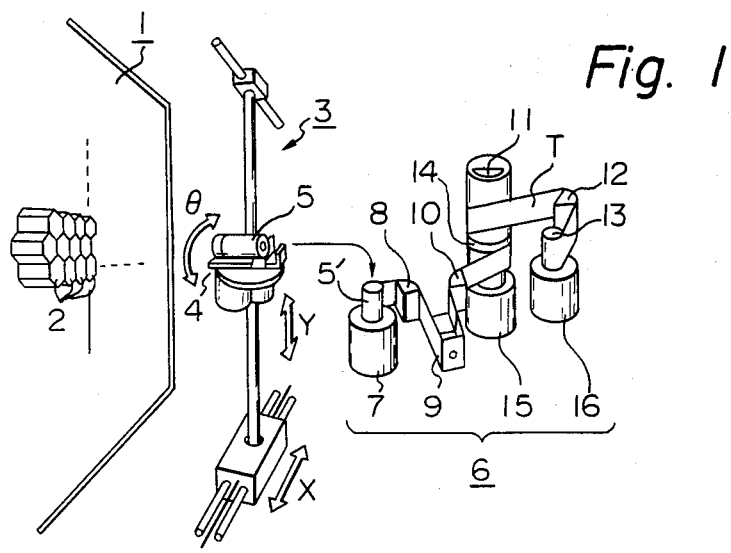
FIG. 1 is a perspective view of portions of a general mass storage system (MSS)

In FIG. 1, which illustrates portions of a general mass storage system, 1 is a cartridge store which has a large number of honeycomb-shaped cells 2. In each of the cells 2, one data cartridge (not shown) is stored. There is an accessor 3 for taking one data cartridge out of the cartridge store 1 or putting one data cartridge into the cartridge store 1. The accessor 3 has a picker 4 for picking up a cartridge 5. In this case, the picker 4 is mounted on the accessor 3 so as to move along the X-, Y- and θ-directions indicated by arrows X, Y and θ, respectively. 6 is a data accessing device which has a spool motor 7, a guide 8, a vacuum column 9, a guide 10, a mandrel 11, a guide 12 and a take-up spool 13. In addition, a magnetic head 14, which is rotated by a motor 15, is mounted on the mandrel 11. Further, the take-up spool 13 is rotated by a take-up motor 16.

The loading operation of a magneic tape T stored in the data cartridge 5 in the data recording device 6 will be explained. First, when the data cartridge 5 is placed into the data accessing device 6, the cartridge is automatically mounted on the axis of the spool motor 7. In this case, the cartridge is indicated by reference 5'. Next, the magnetic tape T in the cartridge 5' is automatically loaded into the data accessing device 6 by a so-called auto-thread method. That is, the magnetic tape T of the cartridge 5' is supplied by the rotation of the spool motor 7 and, after that, the magnetic tape T moves along the guide 8, the guide 10, the mandrel 11 and the guide 12 to the take-up spool 13. As a result, the edge of the magnetic tape T is wound onto the take-up spool 13. At this time, when the winding of the magnetic tape T onto the take-up spool 13 is detected by a detector means (not shown), the vacuum column 9 is exhausted so as to be in a negative pressure state. As a result, as illustrated in FIG. 1, the magnetic tape T is taken into the vacuum column 9. That is, the vacuum column 9 serves as a buffer which prevents a large tension from abruptly being applied to the magnetic tape T.

It should be noted that, in FIG. 1, the magnetic tape T is helically wound on the mandrel 11, and that the recording or reading operation of data is performed upon the magnetic tape T while stationary by the magnetic head 14 which diagonally scans the magnetic tape T.

Figure 2:
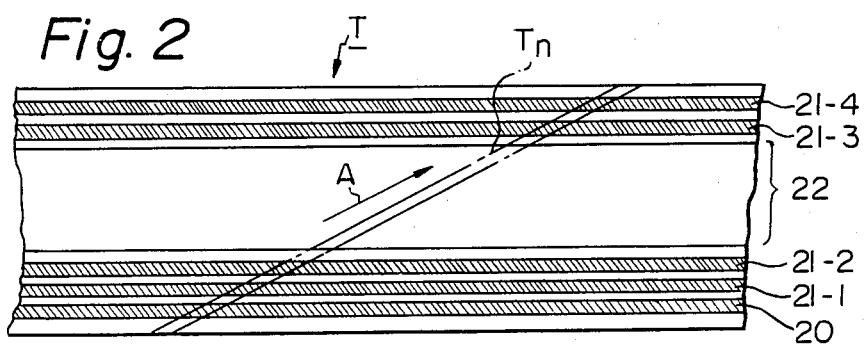
FIG. 2 is a schematic diagram of illustrating a stripe format of the magnetic tape T of FIG. 1.

FIG. 2 is a diagram illustrating a stripe format of the magnetic tape T of FIG. 1. In FIG. 2, recording tracks are formed by stripes which run diagonally across the magnetic tape T. For example, a recording track $T_n$ is a scanning area on which the recording or reading operation is performed by one passage of the magnetic head 14 of FIG. 1. 20 is an ID area on which reference numbers and the like with respect to the recording tracks (stripes) are recorded in advance; and 21-1, 21-2, 21-3 and 21-4 are servo areas on which servo information is recorded so as to make the magnetic head pass through the center of each stripe; 22 is a data area on which, for example, 4096 bytes of data per one stripe can be recorded. Note that the magnetic head 14 of FIG. 1 scans the magnetic tape T along the direction as indicated by an arrow A.

Figure 3:
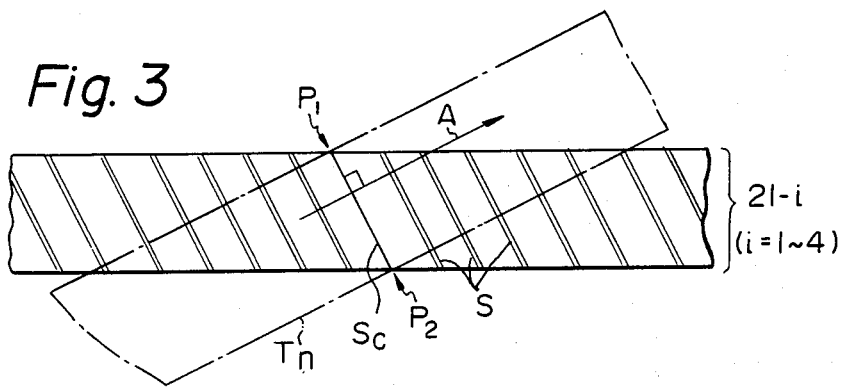
FIG. 3 is an enlargement of the servo area 21-i ($i=1\sim4$) of FIG. 2.

FIG. 3 is an enlargement of the servo area 21-i (i=1~4) of FIG. 2. In FIG. 3, signals $S_c$ and S are generated when the magnetic head penetrates into the servo area. Since the core width of the magnetic head is equal to the length $\overline{P_1P_2}$ of a diagonal at an intersection between the scanning area (recording track) $T_n$ and the servo area 21-i, the signals $S_c$ and S have triangular wave shaped envelopes. In addition, when the scanning area $T_n$ forms a proper scanning locus, the read signal $S_c$ obtained at the above-mentioned intersection has a frequency which is twice those of the other read signals S. Therefore, the difference between the number of signals having a higher level than a predetermined value prior to the detection of the special signal $S_c$ and the number of signals having a higher level than the predetermined value after the detection of the special signal $S_c$ represents a shift quantity of the scanning locus of the magnetic head with a regular scanning position. Thus, the shift quantity is fed back to the take-up motor 16 (FIG. 1) so as to control the feed of the magnetic tape T. As a result, the scanning locus of the magnetic head 14 (FIG. 1) can be corrected.

Figure 4:
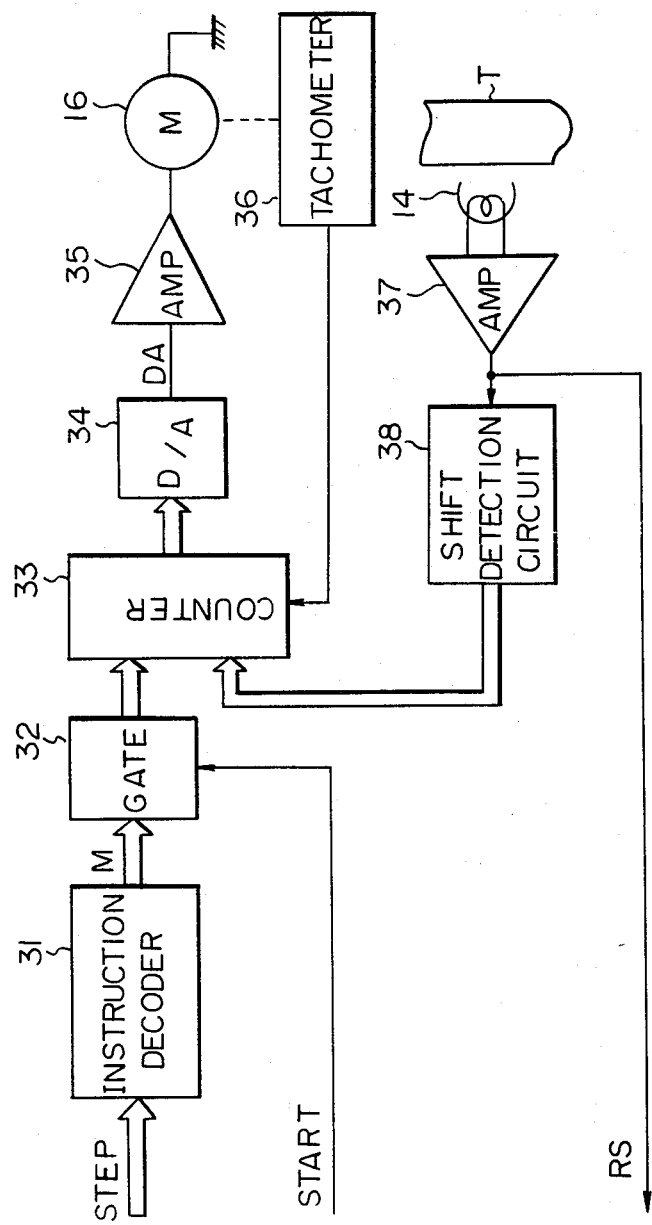
FIG. 4 is a block circuit diagram of a stepping feed control circuit for carrying out the conventional method for controlling the stepping feed of an information medium.

FIG. 4 is a block circuit diagram of a stepping feed control circuit for carrying out the conventional method for controlling the stepping feed of an information medium. In FIG. 4, 31 is an instruction decoder which receives an instruction STEP from an upper unit (not shown) and generates a stepping feed quantity M corresponding to one stripe; 32 is a gate circuit for passing the stepping feed quantity M from the instruction decoder 31 upon receiving a start pulse signal START; 33 is a counter; 34 is a D/A converter for converting a digital output of the counter 33 into an analog voltage; 35 is a driving amplifier for amplifying the output of the D/A converter 34 and driving the take-up motor 16; 36 is a tachometer for generating a tacho-pulse every predetermined rotation angle of the take-up motor 16; 37 is an amplifier for the read signal generated from the magnetic head 14; and 38 is a shift detection circuit for detecting a shift quantity based upon the servo signals read out of the servo areas 21-1 through 21-4 as illustrated in FIG. 2. It should be noted that the stepping feed quantity generated from the instruction decoder 31 corresponds to the rotation quantity of the take-up motor 16 (the rotation quantity of the take-up spool 13 (FIG. 1)) for stepping the magnetic head 14 to the next recording track. Therefore, the above-mentioned stepping feed quantity M changes in accordance with the quantity of the magnetic tape wound on the take-up spool 13.

Figures 5A, 5B, 5C, 5D:
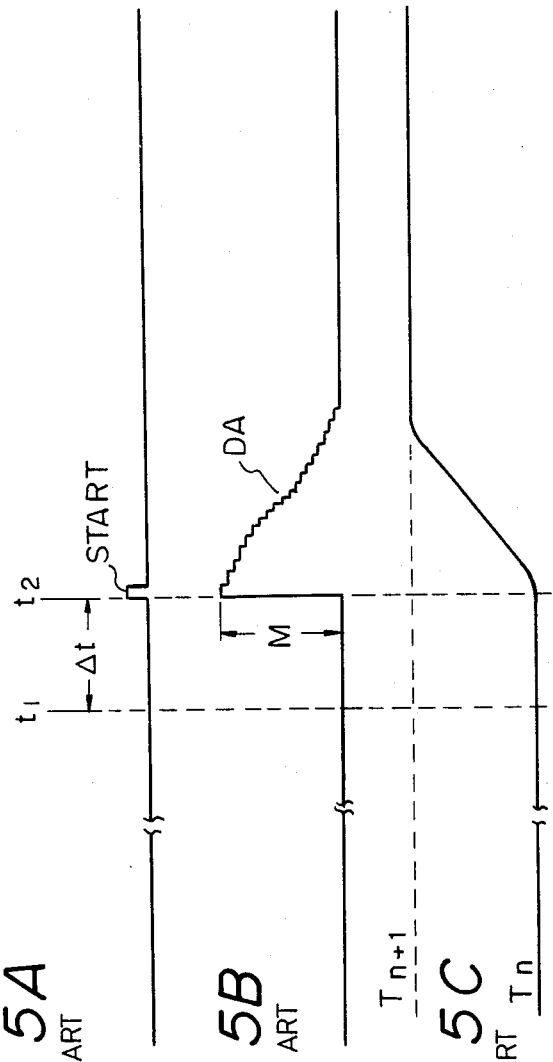
FIGS. 5A through 5D and FIGS. 6A through 6D are timing waveform diagrams for explaining the operation of the circuit of FIG. 4.

The operation of the circuit of FIG. 4 will be explained with reference to FIGS. 5A through 5D. First, as illustrated in FIG. 5C, the magnetic head 14 is located at the n-th recording track $T_n$. In this case, the output voltage DA of the D/A converter 34 remains at zero, as illustrated in FIG. 5B. When the magnetic head 14 performs a turn (one pass of stripe $T_n$), as illustrated in FIG. 5D, the read signal RS comprises an identification signal ID, leading servo signals $LS_1$ and $LS_2$, a data signal DATA and trailing servo signals $TS_1$ and $TS_2$.

A certain amount of time after a point in time $t_1$, when the read operation of the data signal DATA is completed, the checking of the content of the data signal DATA is completed by the upper unit (not shown). As a result of the checking, when no error is detected, the upper unit transmits an order for feeding the magnetic tape T, so as to record or read data on the next recording track $T_{n+1}$, to the data accessing device 6 (FIG. 1). As a result, at a time $t_2$, the data accessing device 6 (FIG. 1) transmits a start pulse signal START to the gate circuit 32, as illustrated in FIG. 5A, in synchronization with the output of a rotational angle detector (not shown) of the magnetic head 14. Therefore, the feed quantity M generated from the instruction decoder 31 is set in the counter 33 and accordingly, as illustrated in FIG. 5B, the D/A converter 34 generates a positive analog voltage which is in proportion to the value of the counter 33, so as to rotate the take-up motor 16 in the forward direction. When the take-up motor 16 rotates in the forward direction, the tachometer 36 generates tacho-pulses in proportion to the rotational angle of the take-up motor 16. In this case, the counter 33 serves as a down counter. Therefore, as illustrated in FIG. 5B, the analog voltage DA of the D/A converter 34 decreases gradually and, when the output DA reaches zero, the take-up motor 16 stops. At this time, as illustrated in FIG. 5C, the magnetic head 14 is located at the (n+1)th recording track $T_{n+1}$. It should be noted that, if the shift detection circuit 38 detects a shift quantity based upon the servo signals $TS_1$ and $TS_2$, the correction of the feed quantity is performed. Thus, after the positioning operation of the magnetic head 14 upon the next recording track $T_{n+1}$ is completed, the magnetic head 14 reads an identification signal ID', leading servo signals $LS_1'$ and $LS_2'$, a data signal DATA' and the like from the recording track $T_{n+1}$, as illustrated in FIG. 5D.

Figures 6A, 6B, 6C, 6D:
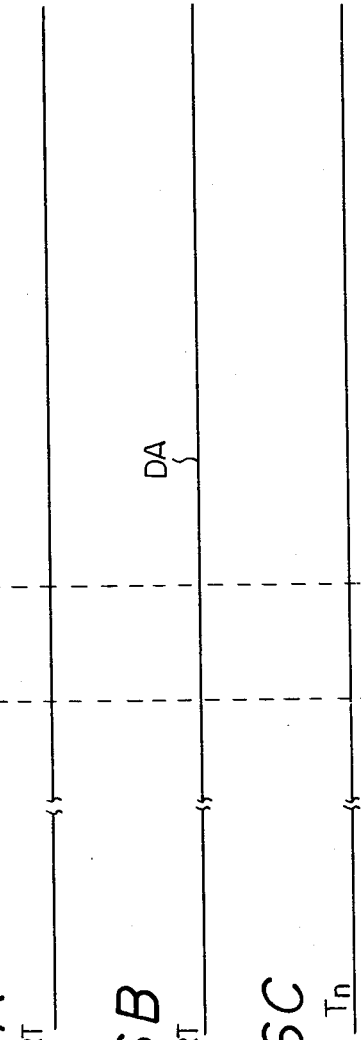

The case wherein an error is detected as a result of checking the above-mention data signal DATA will be explained with reference to FIGS. 6A through 6D. In this case, as illustrated in FIG. 6A, the start pulse is not generated and accordingly, the analog output voltage DA of the D/A converter 34 remains at zero, as illustrated in FIG. 6B. As a result, the magnetic head 14 remains at the n-th recording track $T_n$ as illustrated in FIG. 6C and, accordingly, the same read signal is obtained by rotating the magnetic head 14, as illustrated in FIG. 6D.

In order to increase the transmission rate of data, one approach is to increase the rotation speed of the rotating magnetic head. An increase of the rotation speed of the head not only reduces the data processing time, but also reduces the time required for the stepping feed of the magnetic tape. However, in order to reduce the time required for the stepping feed of the magnetic tape, it is necessary to increase the feed rate of the tape. To do so, it is necessary to increase both the torque of the take-up motor, and the capacity of the take-up motor's power supply. This causes a problem in the size of the installation space. In addition, if the feed rate of the magnetic tape is increased, the magnetic tape may be damaged and it may run unstably. Therefore, there is a limitation to the reduction of the stepping feed time.

According to the present invention, the feed of the magnetic tape begins at the time when the recording or reading operation for the data signal is completed, so that the wait time $\Delta t$, as shown in FIG. 5A, is eliminated. In this case, if an error is detected as a result of checking the data signal DATA, the feed of the magnetic tape is reversed so as to perform the recording or reading operation on the same recording track again.

Figure 7A:
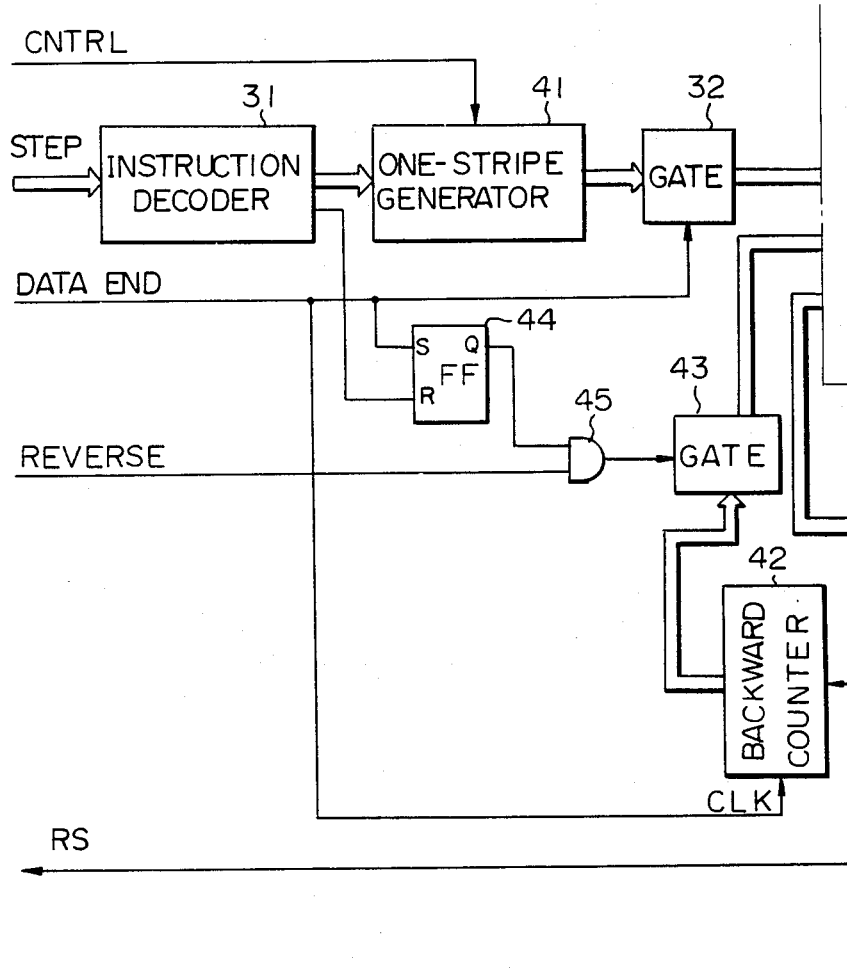
FIGS. 7A & B is a block circuit diagram of a stepping feed control circuit for carrying out the method for controlling the stepping feed of an information medium according to the present invention.
Figure 7B:
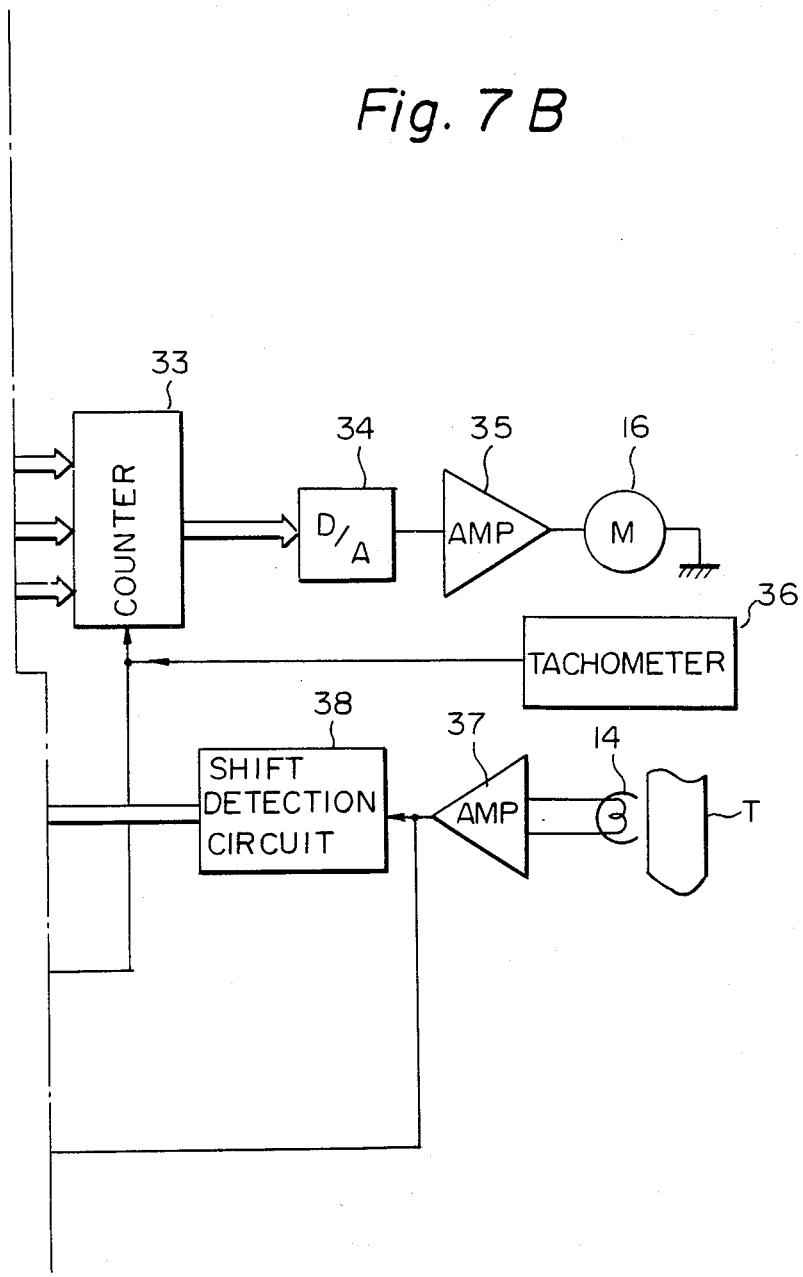

FIG. 7 is a block circuit diagram illustrating of a stepping feed control circuit for carrying out the method for controlling the stepping feed of an information medium according to the present invention. The elements which are the same as those of FIG. 4 are denoted by the same references. In FIG. 7, a one-stripe feed quantity generator circuit 41, a backward quantity counter 42, a gate circuit 43, a flip-flop 44 and a gate circuit 45 are added. A signal pulse DATA END performs a function similar to the start pulse START in FIG. 4 and in addition, a signal pulse REVERSE is used for rotating the take-up motor 16 in the reverse direction.

Figure 8E:
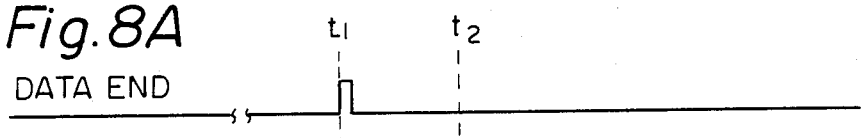
Figure 8E:
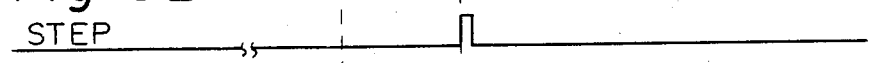
Figure 8E:
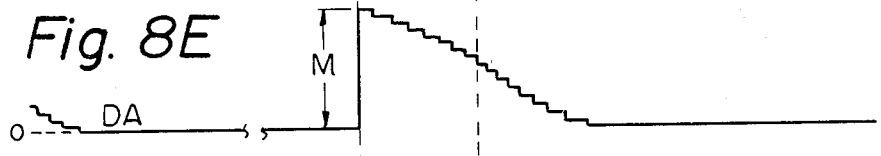
Figure 8F:

The operation of the circuit of FIG. 7 will be explained with reference to FIGS. 8A through 8H. The operation before the time $t_1$, when the recording or reading operation of the data signal DATA on the recording track $T_n$ is completed, is the same as that of the circuit of FIG. 4. At the time $t_1$, as illustrated in FIG. 8A, the data accessing device 6 (FIG. 1) generates the signal pulse DATA END in synchronization with the output of the rotational angle detector (not shown) of the magnetic head 14. As a result, a feed quantity M from the one-stripe feed quantity generator circuit 41 is put in the counter 33 through the gate circuit 32 so that the D/A converter 34 produces an analog output voltage DA as illustrated in FIG. 8E. At the same time, the signal pulse DATA END sets the flip-flop 44 as illustrated in FIG. 8C and, in addition, it clears the backward quantity counter 42 as illustrated in FIG. 8F.

Following the time $t_1$, as the feed of the magnetic tape T proceeds, the contents of the counter 33 and the backward quantity counter 42 are both decreased; however, the absolute value of the contents of the backward quantity counter 42 is increased.

Figure 8G:
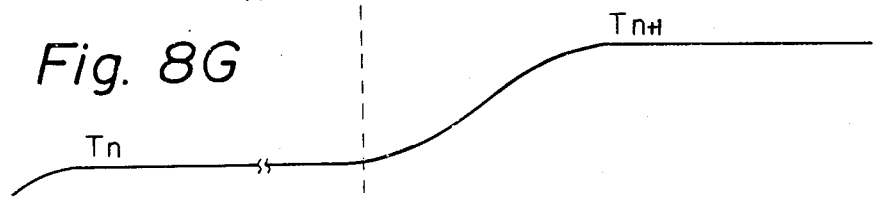
Figure 8H:
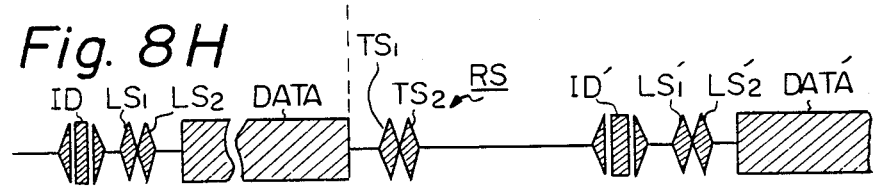

The checking of the content of the data signal DATA in the recording track $T_n$ is completed prior to the completion of the feed of the magnetic tape T. That is, at a time $t_2$ when the checking of the content of the data signal DATA is completed and no error is detected as a result of checking, the upper unit (not shown) produces a step instruction STEP as illustrated in FIG. 8B. This step instruction STEP is detected by the instruction decoder 31 so that the flip-flop 44 is reset as illustrated in FIG. 8C. Therefore, after the time $t_2$, even if a signal pulse REVERSE is applied to the gate circuit 45, the gate circuit 45 will not be opened and accordingly, the gate circuit 43 also will not be opened. As a result, the contents of the counter 33 changes successively as illustrated in FIG. 8E; in other words, the feed of the magnetic tape T in the forward direction is continued, so that the magnetic head 14 is located at the next recording track $T_{n+1}$ as illustrated in FIG. 8G. As the next stripe $T_{n+1}$ is accessed, the magnetic head 14 reads an identification signal ID', leading servo signals $LS_1'$ and $LS_2'$, data signal DATA' and the like, from the recording track $T_{n+1}$, as illustrated in FIG. 8H.

Figure 9F:
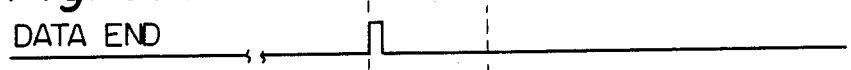
Figure 9F:
Figure 9F:
Figure 9F:
Figure 9F:
Figure 9F:
Figure 9H:
Figure 9H:

The case where an error is detected as a result of checking the data signal DATA will be explained with reference to FIGS. 9A through 9H. In this case, the upper unit does not generate a step instruction STEP as illustrated in FIG. 9B. Therefore, the output FF of the flip-flop 44 remains at a logic value of "1" as illustrated in FIG. 9C. At the time $t_2$, the data accessing device 6 (FIG. 1) generates a signal pulse REVERSE in synchronization with the output of the rotational angle detector of the magnetic head 14, as illustrated in FIG. 9D. As a result, the contents of the backward quantity counter 42 is put into the counter 33 through the gate circuit 43. Therefore, the analog voltage DA of the D/A converter 34 becomes negative, so that the take-up motor 16 rotates in the reverse direction. That is, the take-up motor 16 rotates in the reverse direction by the amount of the feed given by the backward counter 42 and, as a result, the magnetic head 14 is again located at the recording track $T_n$, as illustrated in FIG. 9G. Therefore, after that, the same data signal DATA is obtained by the rotating magnetic head 14.

It should be noted that, after the recording or reading operation on the last track on a cartridge's tape is completed, it is unnecessary to perform the recording or reading operation on the next recording and reading track. Therefore, in this case, the upper unit does not generate a step instruction STEP, so that the magnetic head 14 remains at the same recording track.

In the embodiment as illustrated in FIG. 7, at a time when the feed of the magnetic tape T begins, that is, at the time $t_1$ as illustrated in FIGS. 8A and 9A, the magnetic head 14 may be shifted a little from the center of the recording track $T_n$. It is preferable that such a shift is corrected at the end of the feed operation, regardless of the result of checking. Hereinafter, an embodiment will be explained in which such a shift is corrected simultaneously with the feed operation of the magnetic tape T.

Figure 10:
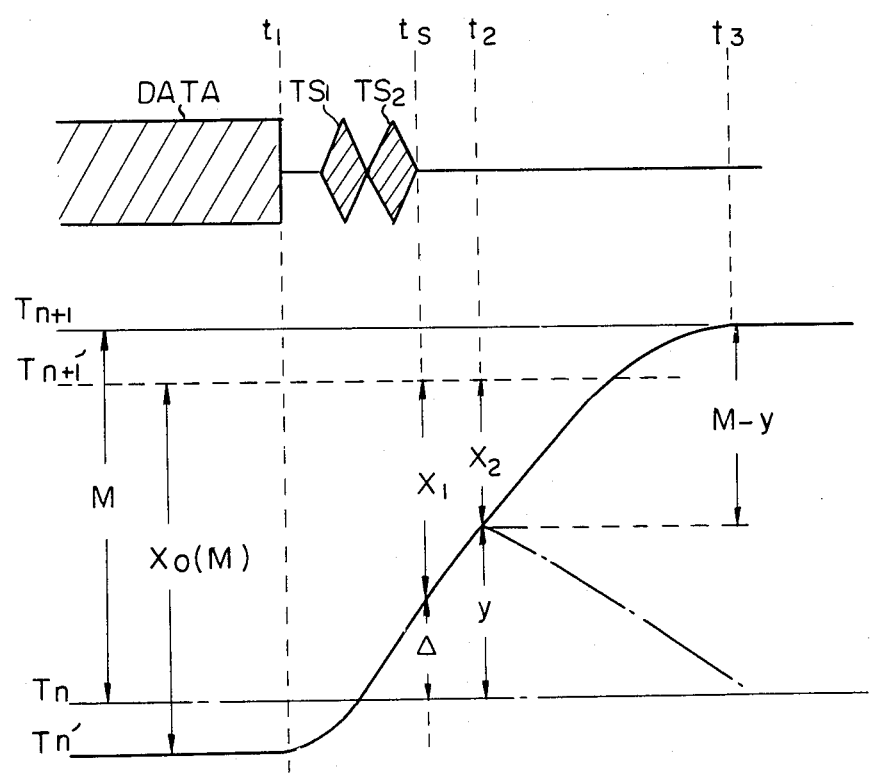
FIG. 10 is a timing waveform diagram for explaining the correction of the stepping feed quantity according to the present invention.

FIG. 10 is a timing waveform diagram for explaining the correction of the stepping quantity according to the present invention. In FIG. 10, M is a distance between the recording tracks $T_n$ and $T_{n+1}$; $T_n'$ is an initial position of the magnetic head 14; $X_0$, $X_1$ and $X_2$ are the contents of the counter 33 at the times $t_1$, $t_s$ and $t_2$, respectively; and $\Delta$ and y are shift quantities from the center of the recording track $T_n$ at the times $t_s$ and $t_2$, respectively.

At the time $t_1$, when the reading operation of a data signal on the recording track $T_n$ is completed, a one-stripe feed quantity $X_0$ corresponding to the distance M is set in the counter 33. At the time $t_2$, when the checking result of the content of the data signal DATA is determined, a shift quantity y of the magnetic head 14, with regard to the recording track $T_n$, can be represented by $$y = X_1 - X_2 + \Delta$$

Therefore, as illustrated in FIG. 10, when no error is detected as a result of checking the content of the data signal DATA, $M - y$ is set in the counter 33 at the time $t_2$, so that the shift correction is completed on the time $t_3$ when the feed operation is completed. On the other hand, if an error is detected as a result of checking the content of the data signal DATA, $-y$ is set in the counter 33 at the time $t_2$, so that the shift correction is completed at the time $t_3$ when the feed operation is completed.

Figure 11A:
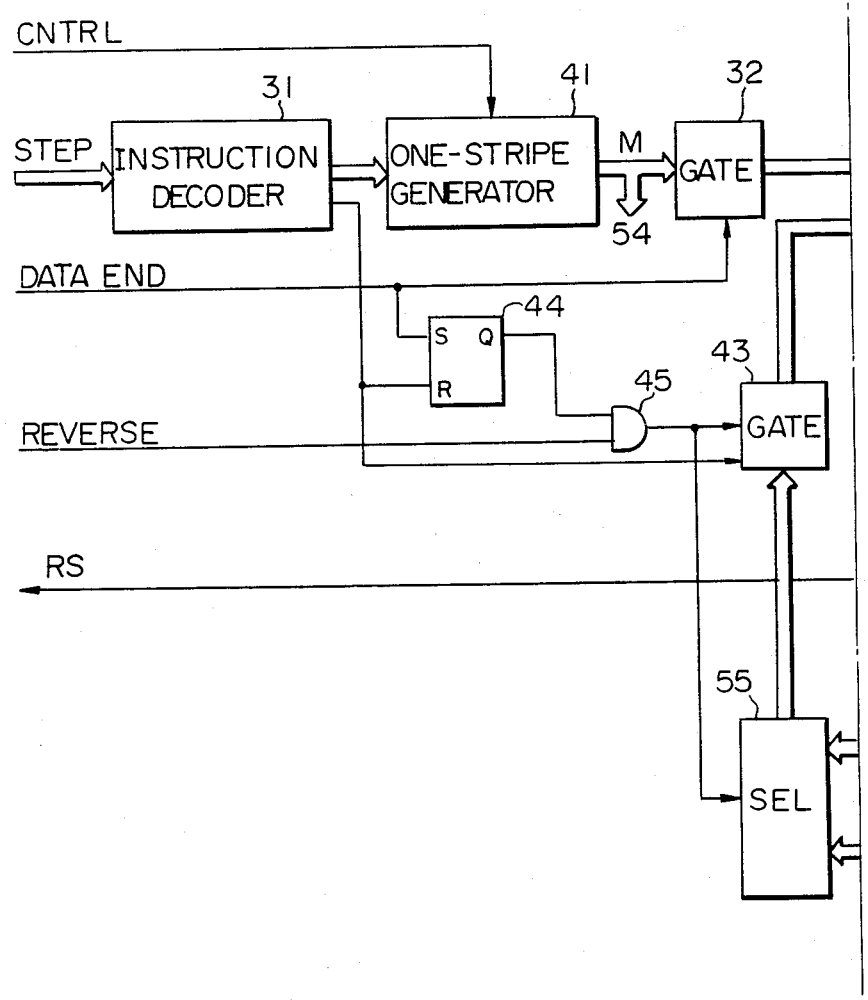
FIGS. 11A & B is a block circuit diagram of another stepping feed control circuit for carrying out the method for controlling the stepping feed of an information medium according to the present invention.
Figure 11B:
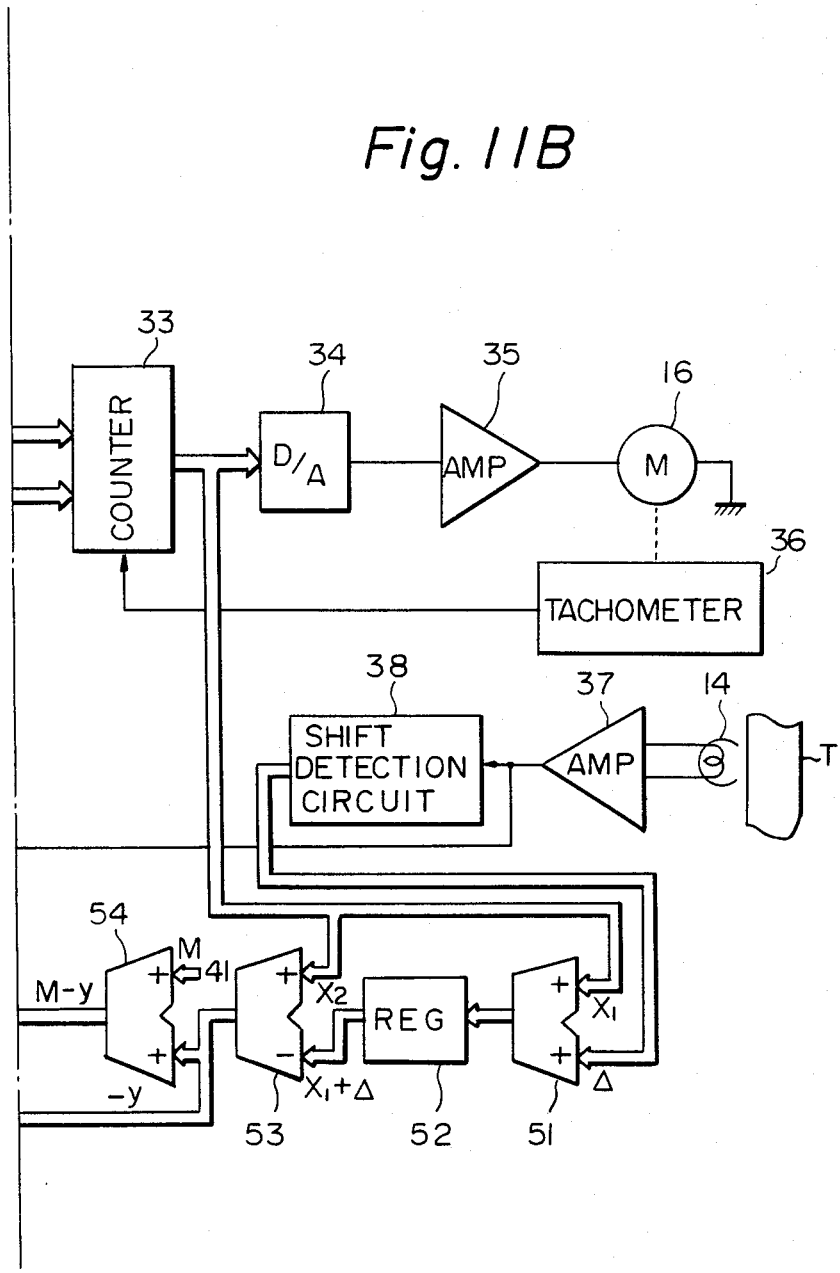

FIG. 11 is a block circuit diagram illustrating another stepping feed control circuit for carrying out the method for controlling the stepping feed of an information medium according to the present invention, in which the shift correction can be effected simultaneously with the feed operation of the magnetic tape. In FIG. 11, the elements which are the same as those of FIG. 7 are denoted by the same references. In FIG. 11, an adder 51, a register 52, a subtracter 53, an adder 54 and a selection circuit 55 are provided instead of the backward counter 42 of FIG. 7.

The operation of the circuit of FIG. 11 will now be explained. At a time (corresponding to the time $t_1$ of FIG. 10) when the data signal DATA of a recording track $T_n$ is read, a signal pulse DATA END is generated so that an initial value $X_0 (=M)$ is set in the counter 33 from the one-stripe feed quantity generator circuit 41. Next, at a time (corresponding to the time $t_s$ of FIG. 10) immediately after servo signals $TS_1$ and $TS_2$ have been detected, the content $X_1$ of the counter 33 and the output $\Delta$ of the shift detection circuit 38 are added by the adder 51, and the resultant value $(X_1 + \Delta)$ is stored in the register 52. At a time (corresponding to the time $t_2$ of FIG. 10) when a step instruction STEP or a signal pulse REVERSE is generated, the content $X_2$ of the counter 33 is subtracted from the content $(X_1 + \Delta)$ of the register 52 by the subtracter 53 and in addition, the resultant value $X_2 - X_1 - \Delta (= -y)$ and the output M of the one-stripe feed quantity generator circuit 41 are added by the adder 54.

Therefore, when the feed of the magnetic tape T in the forward direction is continued, the selection circuit 55 selects the output $M - y$ of the adder 54, since the output of the flip-flop 44 is changed from "1" to "0" due to the step instruction STEP. As a result, the value $M - y$ is set in the counter 33 through the gate circuit 43. On the other hand, when the feed of the magnetic tape T is reversed, the output of the flip-flop 44 remains at "1", so that the selection circuit 55 selects the output $-y$ of the subtracter 53 when a signal pulse REVERSE is generated. As a result, the value $-y$ is set in the counter 33 through the gate 43.

Note that the method according to the present invention is applied to an information medium, such as a magnetic tape or the like on which recording tracks are formed by stripes which run diagonally across the information medium. However, the method according to the present invention can be also applied to an information medium on which recording tracks are formed by stripes which run perpendicularly across the information medium.

In summary, the method for controlling the stepping feed of an information medium, such as a magnetic tape or the like, according to the present invention has an advantage over the conventional method in that the delay caused by the feed operation of the magnetic tape is substantially reduced. Accordingly, the data transfer rate is increased, since the feed of the magnetic tape begins immediately after the recording or reading operation of a data signal on a recording track is completed and without waiting for the result of the checking of the data signal.

FIG. 10 illustrates that in the present invention, even if the recording or reading operation is again performed upon the same recording track, the magnetic tape has to return a distance which is about half of one stripe of the magnetic tape. As a result, the time required to return the tape for a repeated operation is approximately the same as the time required for the feed operation when the recording or reading operation is performed upon the next recording track. The delay time of a repeated operation is approximately one-half of recording or reading operation in the conventional system and, accordingly, each operation would have to be repeated on the average more than twice for the data processing time of the present invention to be slower than the conventional system.

What is claimed is:

1. A method for controlling the stepping feed of a tape-shaped information medium on which recording tracks are formed by stripes, the recording tracks running diagonally or perpendicularly across the information medium, said method comprising the steps of:
   (a) accessing data on a first recording track by performing an action selected from among recording the data and reading the data;
   (b) checking the accessed data on the first recording track;
   (c) feeding the information medium to access data on a second recording track next to the first recording track, said feeding starting after said accessing step (a) is completed and before said checking step (b) is completed; and
   (d) determining whether the feeding of said feeding step (c) is to be continued or reversed in dependence upon the result of said checking step (b) when said checking step (b) is completed and before said feeding step (c) is completed.

2. A method as set forth in claim 1, wherein said accessing is performed by a read/write head, and further comprising a step of (e) correcting the position of the information medium, concurrently with said feeding step (c), by adjusting the feeding so as to properly position the stripes under the read/write head.

3. A method as set forth in claim 2,
wherein the information medium has servo areas and the first and second recording tracks each have a starting point which are separated by a track distance, and
wherein said correcting step (e) comprises the steps of:
(ei) detecting the starting point of the first recording track by using the servo areas;
(eii) recording a first feed distance which the information medium has been fed since step (ei) detected the starting point of the first recording track;
(eiii) calculating a second feed distance required to complete step (c) by subtracting the first feed distance from the track distance; and
(eiv) shifting the information medium in a forward direction by the second feed distance if step (d) determined to continue the feeding of step (c), and in the reverse direction by the first feed distance if step (d) determined to reverse the feeding of step (c).

4. A method as set forth in claim 1, further comprising a step of (e) stopping the method so that there is no feeding step (c) of the information medium during said checking step (b) if the first recording track is the last track to be accessed on the information medium.

5. A method as set forth in claim 1, wherein the said information medium is a magnetic tape used in a mass storage system.

6. A method as set forth in claim 1, wherein said feeding step (c) occurs for an amount of time and comprises a step of counting the amount of time that the information medium is fed.

7. A circuit, operatively connected to a data processing system, for controlling the stepping feed of an information medium on which recording tracks are formed as stripes which run across the information medium, said circuit receiving step, reverse and data end signals from the data processing system which performs data checking on data stored on the information medium, said circuit comprising:
accessing means, disposed adjacent to the information medium, for accessing data on a first recording track;
feeding means, operatively connected to said accessing means and to receive the step and data end signals, for feeding the information medium to access data on a second recording track next to the first recording track, after the accessing is completed and before the data checking is completed; and
determining means, operatively connected to said feeding means and to receive the data end and the reverse signals, for determining whether the feeding is to be continued or reversed.

8. A circuit as set forth in claim 7, wherein said accessing means comprises:
a magnetic head, disposed adjacent to the information medium, for writing data on the information medium, reading data from the information medium and generating a read signal from the information read from the information medium; and
an amplifier, operatively connected to said feeding means and said magnetic head, for amplifying the read signal.

9. A circuit as set forth in claim 7, wherein said determining means comprises:
a flip-flop operatively connected to said feeding means and to receive the data end signal; and
an AND gate operatively connected to said flip-flop and to receive the reverse signal.

10. A circuit as set forth in claim 7, wherein said feeding means comprises:
an instruction decoder, operatively connected to receive the step signal, for decoding the step signal;
a one-stripe generator, operatively connected to said instruction decoder, for generating a stepping feed quantity;
a first gate operatively connected to said one-stripe generator and to receive the data end signal;
counting means, operatively connected to said accessing means, said determining means, said instruction decoder, said one-stripe generator and said first gate, for counting pulses;
a digital/analog converter operatively connected to said counting means;
a driving amplifier operatively connected to said digital/analog converter;
a take-up motor, operatively connected to the information medium and said driving amplifier, for moving the information medium relative to said accessing means;
a tachometer, operatively connected to said counting means and disposed adjacent to said take-up motor, generating a tacho-pulse for a predetermined quantity of rotation of said take-up motor; and
a shift detection circuit, operatively connected to said accessing means and said counting means, for detecting a shift quantity.

11. A circuit as set forth in claim 10, wherein said counting means comprises:
a counter, operatively connected to said first gate, said digital/analog converter, said tachometer and said shift detection circuit, for receiving the stepping feed quantity from said first gate and decrementing the contents of said counter for every tacho-pulse;
a backward counter, operatively connected to said tachometer and to receive the data end signal, resetting to zero upon the receipt of the data end signal and decrementing the contents of said backward counter for every tacho-pulse; and
a second gate, operatively connected to said determining means, said counter and said backward counter, for supplying the contents of said backward counter to said counter when said determining means determines that the feeding is to be reversed.

12. A circuit as set forth in claim 10, wherein said counting means comprises:
a counter, operatively connected to said first gate, said digital/analog converter and said tachometer, for receiving the stepping feed quantity from said first gate and decrementing the contents of said counter for every tacho-pulse;
a first adder, operatively connected to said shift detection circuit and said counter, for outputting the sum of the contents of said counter and the shift quantity when the shift quantity is generated;
a register, operatively connected to said first adder, for storing the output of said first adder;
a subtracter, operatively connected to said counter and said register, for subtracting the contents of said register from the contents of said counter and generating an output;

a second adder, operatively connected to said one-stripe generator and said subtracter, for adding the stepping feed quantity and the output of said subtracter and generating an output;

a selection circuit, operatively connected to said determining means, said subtracter and said second adder, for selecting between the output of said subtracter and said second adder in accordance with whether the stepping feed is to be continued or reversed; and a second gate, operatively connected to said determining means, said instruction decoder, said counter and said selection circuit, for setting the contents of said counter to the output selected by said selection circuit when said determining means determines that the feeding is to be reversed and said instruction decoder decodes the step signal.

* * * * *

UNITED STATES PATENT AND TRADEMARK OFFICE
CERTIFICATE OF CORRECTION

PATENT NO. : 4,492,991
DATED : January 8, 1985
INVENTOR(S) : Osada et al.

It is certified that error appears in the above-identified patent and that said Letters Patent is hereby corrected as shown below:

Front page, col. 2, [57] ABSTRACT,
line 11, "is" should be --should be--;
line 12, delete "should be".

Col. 5, line 44, delete "illustrating".

Signed and Sealed this

Third Day of September 1985

[SEAL]

Attest:

DONALD J. QUIGG

Attesting Officer   Acting Commissioner of Patents and Trademarks - Designate